Figure 1:
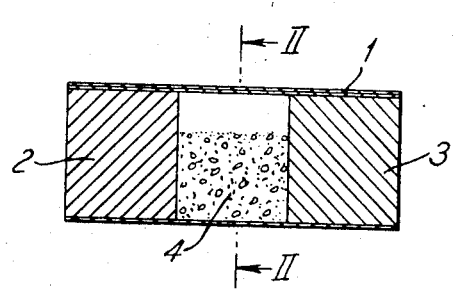

United States Patent

[11] 3,595,137

[72] Inventors Desmond Walter Molins;
 Edward George Preston; Donald John Barber, all of London, England
[21] Appl. No. 751,622
[22] Filed Aug. 9, 1968
[45] Patented July 27, 1971
[73] Assignee Molins Machine Company Limited
 London, England
[32] Priority Aug. 18, 1967, Aug. 29, 1967, Aug. 29, 1967
[33] Great Britain
[31] 38293/67, 39456/67 and 39457/67

[54] FILTER TIPS FOR CIGARETTES
 9 Claims, 5 Drawing Figs.
[52] U.S. Cl.................................................. 93/1 C,
 131/10.5, 131/265, 131/267
[51] Int. Cl..................................................... B31d
[50] Field of Search........................................ 93/1 C;
 131/10.5, 10.7, 265, 266, 267, 268, 269

[56] References Cited
UNITED STATES PATENTS
3,400,032 9/1968 Sexstone et al. ............... 156/380
3,403,202 9/1968 Green et al. .................... 131/267 X Primary Examiner—Bernard Stickney
Attorney—Craig, Antonelli and Hill ABSTRACT: The manufacture of cigarette filters containing a particulate filtering material in a compartment in which beads of polystyrene are expanded within the compartment to take up excess space in it and prevent smoke bypassing the filtering material.

PATENTED JUL 27 1971

3,595,137

Inventors
Desmond Walter Molins
Edward George Preston
Donald John Barber
BY Watson, Cole, Grindle & Watson
Attorneys

FILTER TIPS FOR CIGARETTES

This invention concerns improvements in or relating to filter tips and to methods and apparatus for making filter tips for cigarettes and is particularly although not exclusively, concerned with tips containing a particulate, powdery or finely divided filtering material. The term "cigarette" is to be understood to include cigars, cigarillos and other smokable articles.

One of the problems which arises in connection with filters containing such a material is that of ensuring that all the smoke passes through the filtering material and none is allow to bypass it. In practice it is found to be difficult to pack particulate material into a wrapping sufficiently well to ensure that there is no bypassing.

It is an object of the present invention to provide an improved filter tip and further objects lie in providing methods of an apparatus for producing such a filter tip.

According to one aspect of the present invention there is provided a filter tip for cigarettes which filter tip has a tubular wrapping, smoke-filtering material enclosed within the wrapping and smoke-impervious packing means disposed in the wrapping to take up space across the wrapping not occupied by filter material so as to direct smoke drawn through the filter tip to flow through the filtering material wherein the packing means comprises packing material expanded within the wrapping.

The filtering material may be a particulate material having a beneficial filtering effect, either chemical or physical, on tobacco smoke, and the particles may be of different sizes ranging from fine powder to perhaps a millimeter across.

The packing material may comprise a plastic substance which is introduced into the tip in expansible form and then subjected to action, such as heating, to cause it to expand. An example of such a material is polystyrene having admixed with it an expanding agent such as, for example, a volatile aliphatic fluorocarbon which agent has, for example, been introduced within the wrapping in the form of small beads, either unexpanded or partially expanded, and then heated to cause them to expand.

The tip may comprise one stage of a multistage filter tip, for example, the middle stage of a three stage filter. The invention also includes, however, a multistage filter tip having a plurality of the tips defined above which can also contain different filtering materials.

The packing material and the filtering material may be distributed in any desired manner. They may, for example, be interspersed, more or less evenly, throughout the space within the wrapping, or the packing material in expansible form could be as an annular sleeve enclosing the filtering material, or as a further alternative, the packing material again in expansible form could be disposed alongside the filtering material along the length of the tip.

In another aspect of the invention there is provided a method of manufacturing a filter tip for a cigarette comprising forming a filter tip having a tubular wrapping filter material enclosed within the wrapping and expansible nonporous packing means disposed within the wrapping and causing the packing means to expand within the wrapping to take up space across the tube not occupied by filter material so as to direct smoke drawn through the filter tip to flow through the filtering material.

The method can include the step of applying the packing material to that surface of the wrapping that will form the inner surface of the tube, prior to forming the tube, and can comprise forming a plurality of said filter tips in a continuous rod from a continuous web of wrapping material including the steps firstly of applying adhesive to selected portions of the web and then applying the packing material to the web to be retained on the adhesive-coated portions. This may be done by devices similar to known bronzing devices for applying bronze powder to a continuous cigarette-paper web in order to print a brand name or other device on the paper. Conveniently the material may be projected against the paper by an air jet, those particles which impinge on parts of the paper not coated with adhesive being swept off the paper strip and returned to their source in any convenient way. Bronzing devices, of course, apply powder to that side of the cigarette paper web which will form the outer surface of the tubular cigarette wrapper, whereas in the present case, the adhesive is applied to that side of the paper strip which will be the inner surface of the tubular wrapper of the filter.

The method can comprise feeding a wrapper strip which is to form said wrapping in a partially folded form together with a plurality of endwise-spaced filter plugs disposed in said wrapper strip past two supply sources one of which supplies particulate filtering material to the space between the plugs and the other of which supplies expansible packing material to the spaces between the filter plugs. This aspect of the method can extend to forming a continuous rod filter tip wherein the wrapper strip is continuous and is fed continuously past the two material supply sources and wherein each source continuously supplies discrete metered quantities of material to the said spaces.

The invention also extends to apparatus for carrying out the methods described, which comprises means to form a continuous filter tip rod having a tubular wrapping having smoke-filtering material enclosed within that wrapping, and having expansible smoke-impervious packing means disposed within the wrapping and means to cause the packing means to expand to take up apace across the tube not occupied by filter material.

Figure 2:
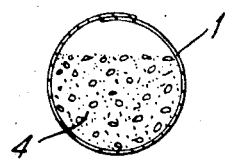
Figure 3:
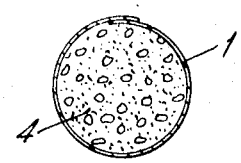
Figure 4:
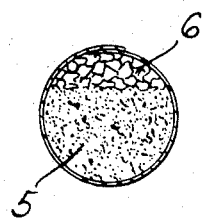
Figure 5:
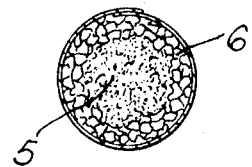

Some embodiments of the invention will now be described, by way of example, with reference to the accompanying drawings in which:

FIG. 1 is a longitudinal cross section of one embodiment of the filter tip for cigarettes during its manufacture, FIG. 2 is a section on the line II–II of the filter tip of FIG. 1, FIG. 3 is a view similar to FIG. 2 of the completed filter tip, and FIGS. 4 and 5 are views similar to FIG. 3 of further embodiments of filter tips for cigarettes.

Referring to FIGS. 1 to 3 the filter tip shown comprises a tubular wrapping 1 enclosing two filter plugs 2 and 3 which are disposed at the ends of the tube formed by the wrapping 1 to define between them a space within the wrapping in which there is disposed a filtering mixture 4 which comprises particles of filtering material and expandable beads of polystyrene packing material. In FIGS. 1 and 2 the beads of polystyrene are in an unexpanded or partially expanded state whereas in FIG. 3 the manufacture of the filter tip has been completed by heating it to a temperature such as to cause the beads of polystyrene to expand so that the filtering mixture 4 tightly packs the space within the wrapping. Since the polystyrene is nonporous, any smoke which is drawn through such a filter tip has to pass through the filtering material.

In the embodiment of FIG. 4 the space between the plugs 2 and 3 has been filled by first introducing the filtering material 5 whilst the wrapping 1 is open, then adding a layer 6 of expandable polystyrene beads, closing the wrapping and then heating the tip to expand the beads 6.

In the embodiment of FIG. 5 the polystyrene beads 6 are formed in a sleeve about the filtering material 5. This can be done by applying adhesive to the appropriate part of the wrapping 1, prior to forming the tip, scattering expandable polystyrene beads on the adhesive, forming the tip with the filtering material 5 encircled by the part of the wrapping 1 that is coated internally with polystyrene beads and then heating the tip to expand the beads.

Filter tips as shown in FIGS. 1 to 3 can be made with the use of apparatus such as that described and claimed in U.S. Pat. Nos. 3,312,151, 3,312,152, 3,340,775, 3,348,455 and 3,367,245 and in addition means, such as agitator means, can be provided to ensure thorough mixing of the filtering material with the packing material.

A continuous filter rod may be made on a machine basically similar to a machine disclosed in U.S. Pat. Nos. 3,131,612 and 3,143,202 and arranged to feed filter plugs at spaced intervals on a continuous travelling paper strip, but also including means to deposit particulate filtering material on the strip between the plugs. The paper strip is fed over a guide roller from which it passes on to an endless tape which runs along a trough and is progressively shaped to "U" cross section, the filtering material being deposited at a position when the belt and paper strip have assumed a "U" cross section. As the paper web approaches its guide roller, however, it is flat, and to form filters like those of FIG. 5 the adhesive patches are applied to the flat strip, and the beads of expansible material are sprayed or blown on to the strip also while it is in a flat condition and approaching the guide roller.

The adhesive patches are applied only part way across the width of the strip so as to leave at least one marginal portion free of adhering material to facilitate forming a neat seam when the paper strip is finally folded and secured around the plugs and filtering material.

Filters like those shown in FIG. 4 can be made with apparatus comprising feeding means to feed a wrapper strip in partially folded form and containing at least two filter plugs spaced apart endwise, past a supply source which supplies particulate filtering material to the space between the plugs, and past another supply source which supplies expansible packing material, e.g. polystyrene beads, to said space. The feeding means may be arranged to feed a continuous wrapper strip endwise, plug-feeding means being provided to supply plugs to the wrapper strip in spaced succession, and the two supply sources may include two hoppers beneath which the wrapper strip passes. Each hopper may have associated with it a dispensing device, such as a pocketed wheel, the pockets being arranged to receive material in desired quantities from the hopper and transfer it into spaces between plugs on the wrapper strip. The apparatus includes means to bow the wrapper strip to substantially "U" cross section about the plugs.

The arrangement may be substantially similar to that illustrated in FIG. 2 of the drawings accompanying U.S. Pat. Nos. 3,131,612 and 3,143,202 except that the single hopper serving the two dispensing wheels 25a and 25b as shown in that Figure is replaced by two separate hoppers, one for each wheel. The upstream hopper is intended according to the present invention to contain particulate filtering material, such for example as carbon granules, and the downstream hopper is for the expansible packing material such as polystyrene beads. Since more of the filtering material is required than of the packing material, the pockets of the upstream wheel should be larger than those of the downstream wheel.

If desired, of course, the packing material could be deposited before the filtering material, in which case the arrangement of the hoppers and dispensing wheels could be reversed.

The invention also extends to cigarettes incorporating the filter tips described.

We claim:

1. A method of manufacturing a filter tip for a cigarette comprising the steps of forming a cylindrical member comprising a wrapping material in tubular form containing a smoke-filtering material and a permanently expandable smoke-impervious packing material and then permanently expanding the packing material within the wrapping material to take up all space across the tubular member not occupied by filtering material whereby smoke drawn through the filter tip will be directed to flow only through the filtering material.

2. A method according to claim 1 wherein the step of forming a cylindrical member comprises applying said packing material to one surface of the wrapping material and then folding said wrapping into a tubular configuration with said packing material contained therein.

3. A method for forming a continuous rod comprising a plurality of filter tips, said method comprising longitudinally feeding a continuous web of wrapping material, applying adhesive to selected portions of the web, applying a permanently expandable smoke-impervious packing material having an expanding agent admixed therein to the web to be retained on the adhesive coated portions, applying smoke-filtering material to the web between said adhesive coated portions, folding said web about said materials to form a tube, and permanently expanding the packing material within the wrapping material to take up space across the tube not occupied by filter material whereby smoke drawn through the filter tip will be directed to flow through the filtering material.

4. A method according to claim 1 wherein an air stream is directed towards said continuous web of wrapping material to apply the packing material thereto and remove excess packing material from the web.

5. A method for forming a continuous rod comprising longitudinally feeding a continuous web of wrapping material, applying a permanently expandable smoke-impervious packing material and smoke-filtering material to the web at intervals along its length, arranging filter plugs between said intervals along the length of the web, folding said web about said materials and filter plugs to form a tube and permanently expanding the packing material within the tube to take up all space across the tube between said filter plugs not occupied by filter material whereby smoke drawn through the filter tip will be directed to flow through the filtering material.

6. A method of manufacturing a filter tip for a cigarette as claimed in claim 1 wherein said cylindrical member is formed by feeding a web of said wrapping material having filter plugs therealong past two supply sources, one of which supplies particulate filtering material and the other of which supplies expansible packing material to the spaces between the filter plugs.

7. A method according to claim 6 for forming a continuous rod filter tip wherein the web of wrapping material is continuous and is fed continuously past the two material-supply sources and wherein each source supplies discrete metered quantities of material to said spaces.

8. A method according to claim 1 wherein the packing material comprises expansible beads of polystyrene admixed with a heat-responsive expanding agent, said step of expanding including the step of heating the beads in the formed cylindrical member to cause them to permanently expand to take up any available space.

9. A method according to claim 1 wherein said smoke-filtering material and said expandable smoke-impervious packing material are provided in the form of a mixture.